US 6,714,580 B2

(12) United States Patent
Ecklund et al.

(10) Patent No.: US 6,714,580 B2
(45) Date of Patent: Mar. 30, 2004

(54) CURRENT CONTROL BIASING TO PROTECT ELECTRODE SEALS

(75) Inventors: Steven P. Ecklund, St. Anthony, MN (US); Timothy J. Callaghan, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 247 days.

(21) Appl. No.: 10/005,285

(22) Filed: Dec. 5, 2001

(65) Prior Publication Data

US 2004/0008351 A1 Jan. 15, 2004

(51) Int. Cl.[7] ............................................. H01S 3/083
(52) U.S. Cl. ................................. 372/94; 356/350
(58) Field of Search ............................ 372/94; 356/350

(56) References Cited

U.S. PATENT DOCUMENTS

| | | | |
|---|---|---|---|
| 3,612,690 A | 10/1971 | Staats et al. ................ 356/106 |
| 4,481,635 A | 11/1984 | Broberg et al. ............... 372/94 |
| 4,672,624 A | 6/1987 | Ford ........................... 372/87 |
| 5,098,189 A | 3/1992 | vonBieren .................. 356/350 |
| 5,196,905 A | 3/1993 | Hahn et al. ................ 356/350 |
| 5,271,027 A | 12/1993 | Hrovat et al. ................ 372/38 |
| 5,414,727 A | 5/1995 | Berndt et al. ................ 372/38 |
| 5,432,604 A | 7/1995 | Canfield et al. ............ 356/350 |
| 5,552,608 A | * 9/1996 | Gallagher et al. ..... 250/370.15 |
| 5,738,678 A | * 4/1998 | Patel ............................ 606/10 |
| 5,811,816 A | * 9/1998 | Gallagher et al. ..... 250/370.15 |
| 5,856,995 A | * 1/1999 | Morris ......................... 372/87 |
| 6,025,914 A | * 2/2000 | Ford et al. .................. 356/459 |
| 6,072,580 A | 6/2000 | Barnes et al. ............... 356/350 |
| 2002/0105994 A1 | * 8/2002 | Partlo et al. .................. 372/57 |

FOREIGN PATENT DOCUMENTS

GB 2 041 635 9/1980
WO WO 0135055 5/2001 ........... G01C/19/66

OTHER PUBLICATIONS

Geosling, Christine E., "Clean Cavity Contamination in Gas Lasers" SPIE vol. 2714/689–695.

* cited by examiner

Primary Examiner—Leon Scott, Jr.
(74) Attorney, Agent, or Firm—McDonnell Boehnen Hulbert & Berghoff

(57) ABSTRACT

Current control biasing of a ring laser gyroscope is employed to protect electrode seals. A frame of a ring laser gyroscope has more than one electrode attached to it. An electric field is created between the electrodes during the operation of the gyroscope, which causes ions in the frame to migrate towards a lowest electrical potential. Electrode seals are located between the electrodes and the frame. By providing a positive power supply voltage and connecting the current control to the non-ground side of the power supply, the mounting structure may be at the lowest electrical potential. The ions will then migrate towards the mounting structure, which significantly reduces migration to the electrodes.

26 Claims, 6 Drawing Sheets

CURRENT CONTROL BIASING TO PROTECT ELECTRODE SEALS

FIELD

The present invention relates generally to ring laser gyroscopes, and more particularly, relates to a method of preventing electrode seal degradation.

BACKGROUND

A ring laser gyroscope detects and measures angular rates by measuring the frequency difference between two counter-rotating laser beams according to the Sagnac effect. The two laser beams simultaneously circulate in the cavity of the gyroscope. Mirrors are used to reflect each beam around the cavity. The two laser beams will ideally have identical frequencies when the sensor is at rest. If the sensor is rotated, the beams will have different frequencies. This frequency difference is measured to provide the rate of rotation.

Gyroscopes are used in navigation, stabilization, guidance, and control applications and are located in aircraft, boats, tanks, pipelines, and missiles. The applications generally fall within one of two categories, single or short term use, and continuous or long term use. An example of a single use application of a ring laser gyroscope is a missile application. The gyroscope guides the missile to its target and is destroyed upon impact. This type of gyroscope has an operational lifetime that may be measured in minutes and is not exposed to the harsh operating conditions that the continuous use gyroscopes are. The single use ring laser gyroscopes are generally smaller and manufactured with different materials than continuous use gyroscopes.

An example of a continuous use application of a ring laser gyroscope is an aircraft application. The operational lifetime of a ring laser gyroscope on a commercial airplane may be ten to twenty years. The gyroscope is exposed to extreme temperature and pressure fluctuations over an extended period of time. Because of the extreme conditions in which a continuous use gyroscope may be operated, the frame of this type of gyroscope must be manufactured using materials that are resistant to expansion over a wide temperature range. One such material is Zerodur, a glass ceramic material with an extremely low co-efficient of thermal expansion.

One of the problems with using this type of frame material is that it tends to have a higher ionic conductivity value than other dielectric materials. These frame materials contain alkali ions that are highly mobile in the presence of an electrical field. The ions are attracted to the cathode mounted on the frame of the gyroscope because it is at the lowest electrical potential due to the typical method of applying power to the gyroscope. The migration of the alkali ions to a cathode will cause an ion-rich layer to be deposited on the seal located between the cathode and the frame.

Indium is frequently chosen as a seal material because of its unique properties of adhering to both ceramics and metals, and of not losing its vacuum seal in the presence of thermal expansion. For the proper operation of the gyroscope, this seal must not degrade allowing the lasing gas to escape. Therefore, there is a need to prevent the degradation of the seal.

U.S. Pat. No. 5,856,995, "Ring Laser Gyroscope with Ion Flux Trap Electrode," described a method of trapping the ions before they migrate to the cathode. This method requires an electrode ring to be placed in direct electrical contact with the frame surrounding the cathode as seen in FIG. 1. The electrode ring has a more negative electric potential than the cathode. This will attract the ions to the ring, and not to the cathode, preventing the ions from degrading the seal. The electrode ring may be made of a thin sheet of copper attached with a conducting adhesive, a thin metal film applied by vacuum deposition, a machined metal alloy attached by mechanical means, or conductive ink brushed onto the frame surface.

Another technique is set forth in U.S. Pat. No. 6,025,914, "Cathode Seal Including Migration Resistant Dielectric Material", which is assigned to the same assignee as the present invention. This method adds a dielectric barrier material between the gyroscope frame and the cathode as seen in FIG. 2. The dielectric barrier material layer reduces the electric field formed in the gyroscope frame, and thus reduces the ion migration. The dielectric barrier may be formed by vapor deposition or welding a sheet of material between the cathode and the frame.

It would be desirable to prevent an ion layer from forming on an electrode seal without modifying the manufacturing process of a ring laser gyroscope.

SUMMARY

An exemplary embodiment is described for using current control biasing to protect electrode seals on a ring laser gyroscope. The seals are located between the frame of the gyroscope and each of the electrodes. When the gyroscope is energized, ions in the frame will generally migrate towards the lowest electrical potential. If one of the electrodes is at the lowest electrical potential, the ions will form a layer on the electrode seal causing it to degrade. By providing a positive supply voltage and locating the current control on the non-ground side of the power supply, the mounting structure will be at the lowest electrical potential.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION

Figure 1:
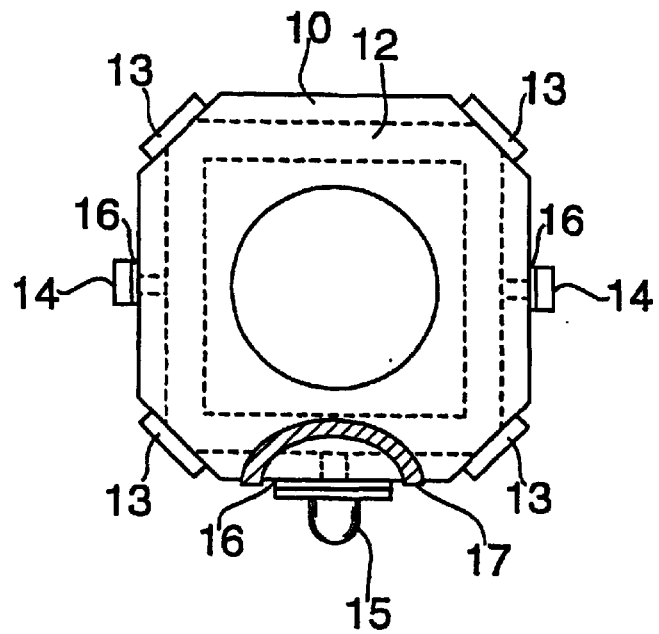
FIG. 1 is a plan view of a technique employing an electrode ring.
Figure 2:
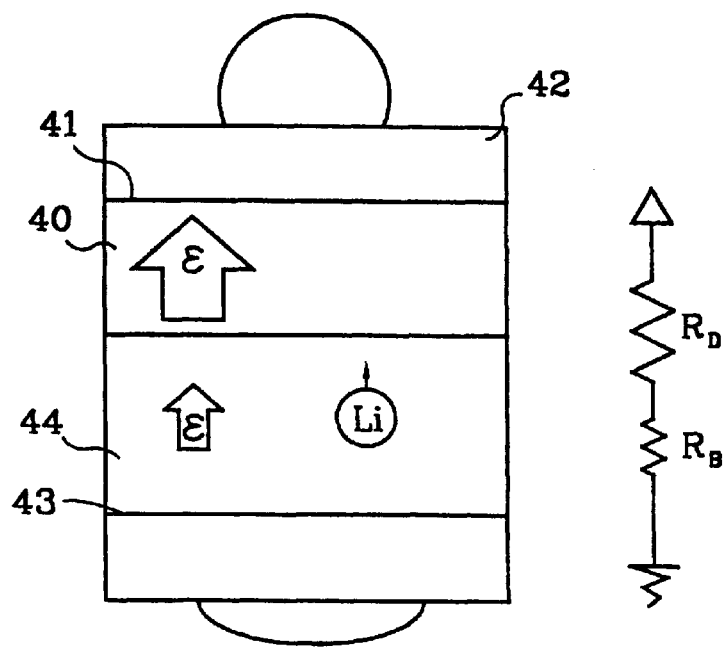
FIG. 2 is a plan view of a technique employing a dielectric barrier material.
Figure 3:
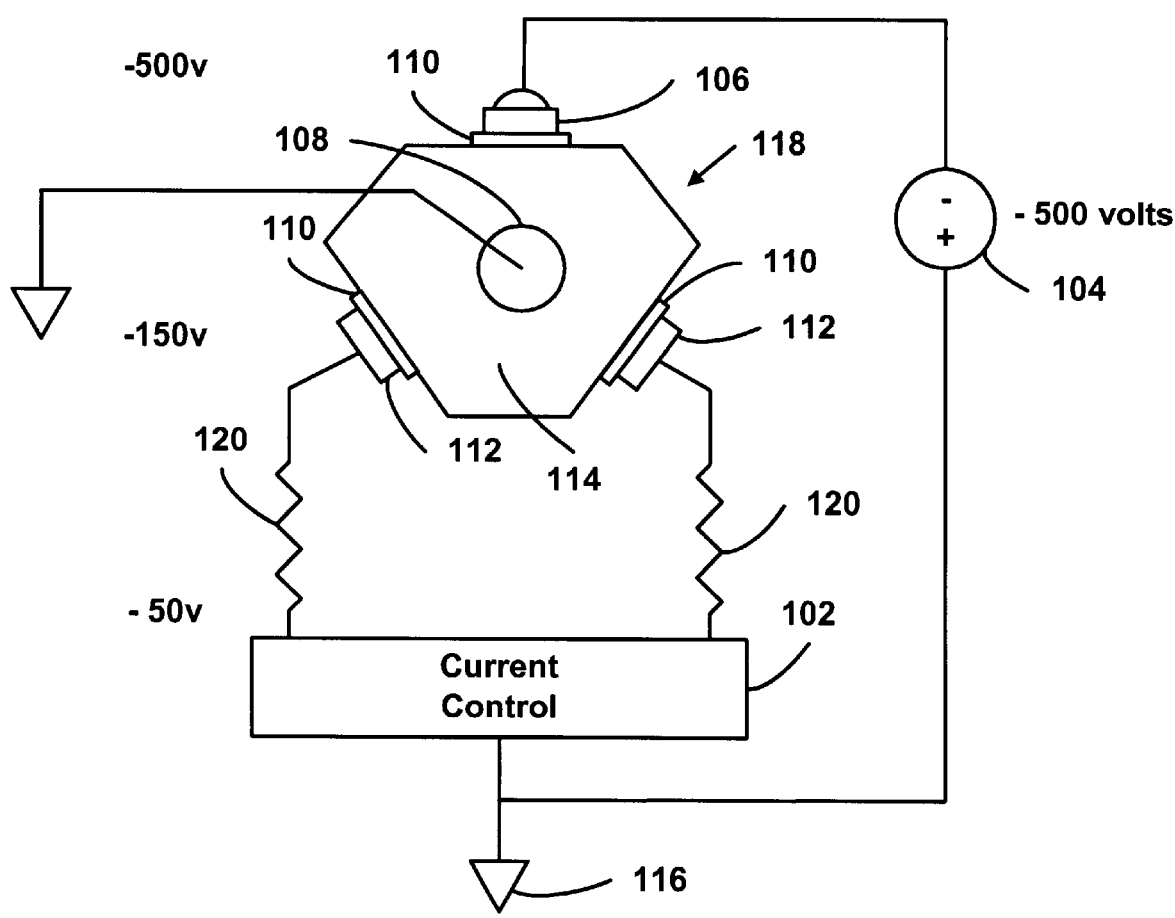
FIG. 3 is a schematic of a ring laser gyroscope system showing the location of a typical current control with respect to ground.

FIG. 3 provides a schematic of a ring laser gyroscope system 100, which includes a ring laser gyroscope 118, a current control 102, a power supply 104, and a mounting structure 108.

The ring laser gyroscope 118 is composed of a frame 114, electrodes 106, 112, electrode seals 110, a cavity, and mirrors. The frame 114 may be constructed of a glass ceramic such as Zerodur, which has an extremely low coefficient of thermal expansion. Other frame materials may also be suitable. In an exemplary embodiment, the electrodes located on the frame 114 include one cathode 106 and two anodes 112; however, other configurations are possible. For example, the ring laser gyroscope 118 could have two cathodes 106 and one anode 112. The electrode seals 110 are located between the frame 114 and each of the electrodes 106, 112. The electrode seals 110 in an exemplary embodiment are constructed of indium. Other materials, such as tin, lead or alloys made with indium, tin or lead, may also be used to construct the seals. The cavity of the gyroscope 118 is located within the frame 114. Mirrors are used to direct the laser beams around the cavity. The cavity and mirrors are not depicted in FIG. 3.

The power supply 104 may be located between the current control 102 and the cathode 106. The power supply 104 may have one side that is electrically connected to ground 116 and another side that is electrically connected to a non-ground side. The current control 1.02 is connected to the anodes 112 on the frame 114 of the ring laser gyroscope 118 through ballast resistors 120. The current control 102 may be used to hold the electrical current entering the anodes 112 to a constant level. Ballast resistors 120 are selected based on the size of the ring laser gyroscope 118 and the type of lasing gas employed, and are used to minimize the oscillations of the lasing gas.

The frame 114 is mounted on the mounting structure 108. The mounting structure 108 in an exemplary embodiment is a dither motor. Other mounting structures may be employed.

FIG. 3 shows a schematic representation of a typical method of powering the ring laser gyroscope system 100. The power supply 104 applies a negative voltage to the gyroscope 118. A typical supply value is −500 volts, but other negative voltages may be used. The current control 102 is connected to the ground 116 side of the power supply 104. This allows the current control 102 to stay at or near ground potential to minimize current leakage, which may cause a current imbalance. The cathode 106 may become negatively biased with respect to the mounting structure 108. Ions may migrate to the cathode 106 if it is at the lowest electrical potential of the ring laser gyroscope system 100. The ions may form a layer on the electrode seal 110 associated with the cathode 106, which may cause the seal 110 to degrade over time.

Figure 4:
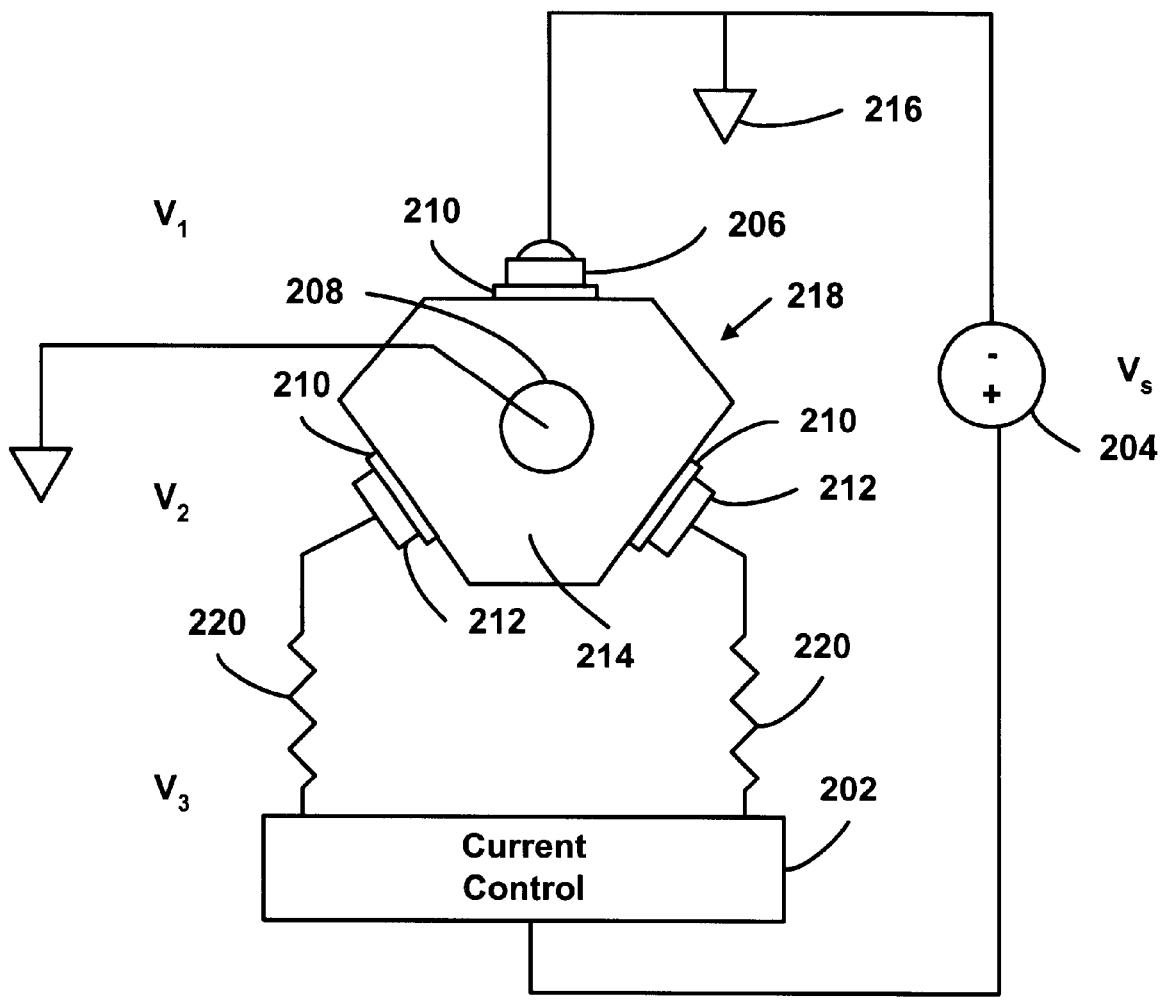
FIG. 4 is a schematic of a ring laser gyroscope system showing the location of the current control with respect to ground, according to an exemplary embodiment of the present invention.

FIG. 4 is a schematic of an exemplary embodiment of powering a ring laser gyroscope system 200. The ring laser gyroscope system 200 is comprised of a ring laser gyroscope 218, a current control 202, a power supply 204, and a mounting structure 208. The ring laser gyroscope 218 and the mounting structure 208 may be substantially the same as the ring laser gyroscope 118 and the mounting structure 108 of the ring laser gyroscope system 100.

The ring laser gyroscope 218 is composed of a frame 214, a cathode 206, two anodes 212, electrode seals 210, a cavity, and mirrors. The electrode seals 210 are located between the frame 214 and each of the cathode 206 and anodes 212. The cavity of the gyroscope 218 is located within the frame 214. Mirrors are used to direct the laser beams around the cavity. The cavity and mirrors are not depicted in FIG. 4.

The power supply 204 is located between the current control 202 and the cathode 206. A ground 216 side of the power supply 204 is connected to the cathode 206 and a non-ground side is connected to the current control 202. The current control 202 is connected to anodes 212 on the ring laser gyroscope 218 through ballast resistors 220. A resistance value is selected based on the size of the ring laser gyroscope 218 and the type of lasing gas employed.

Figure 5:
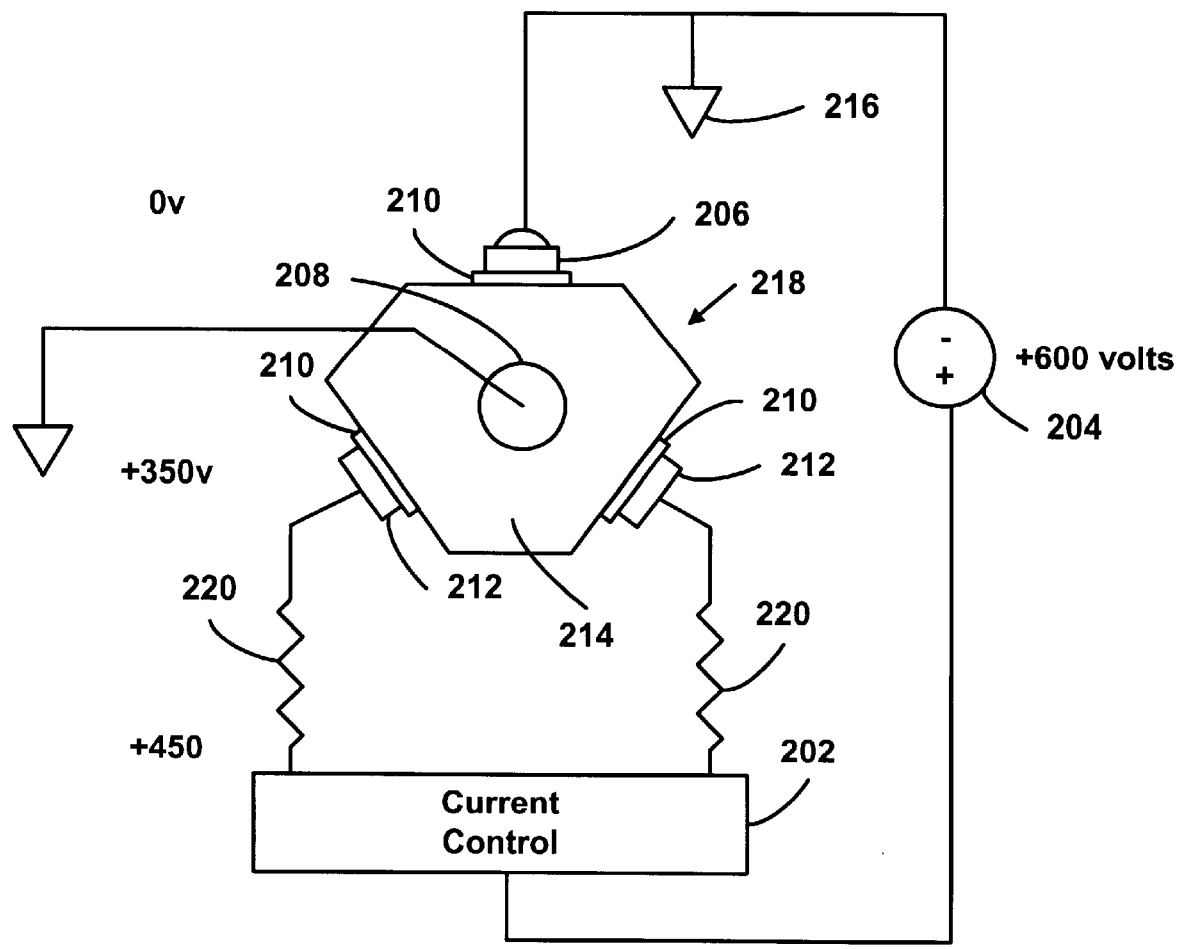
FIG. 5 is a schematic of a ring laser gyroscope system showing exemplary voltage values, according to an exemplary embodiment of the present invention.

FIG. 5 is a schematic of an exemplary embodiment showing exemplary voltage values. The power supply 204 provides a positive supply voltage. A typical supply value is +600 volts; however, the supply value is based on the size of the ring laser gyroscope 218 and the type of lasing gas employed. Larger gyroscopes 218 and higher lasing gas pressures may require a higher supply value.

By providing a positive supply voltage and positioning the current control 202 on the non-ground side of the power supply 204, both the mounting structure 208 and the cathode 206 may be at the lowest electrical potential of the ring laser gyroscope system 200. Ion diffusion may now be directed towards both the mounting structure 208 and the cathode 106 and away from the anodes 112. Because the impedance between the anodes 212 and the mounting structure 208 is smaller than the impedance between the anodes 212 and the cathode 206, the ions will reach the mounting structure 208 prior to reaching the cathode 206. Therefore, substantially fewer ions will migrate to the cathode 206. Ion degradation of the electrode seals 210 may be reduced, increasing the lifetime of the seals 210, and thereby increasing the operational lifetime of the gyroscope 218. No modifications to the manufacturing process of the ring laser gyroscope 218, such as adding an electrode ring or a dielectric barrier, are necessary.

In this exemplary embodiment, the ions migrate towards the mounting structure 208. The mounting structure 208 may not be damaged by ion accumulation during the operational lifetime of the gyroscope 218. It is unlikely that the mounting structure 208 will form a part of the cavity containing the lasing gas; therefore, while a leak into the cavity and contamination of the lasing gas may be a failure mode of the electrode seals 210, it is not a typical failure mode of the mounting structure 208.

Figure 6:
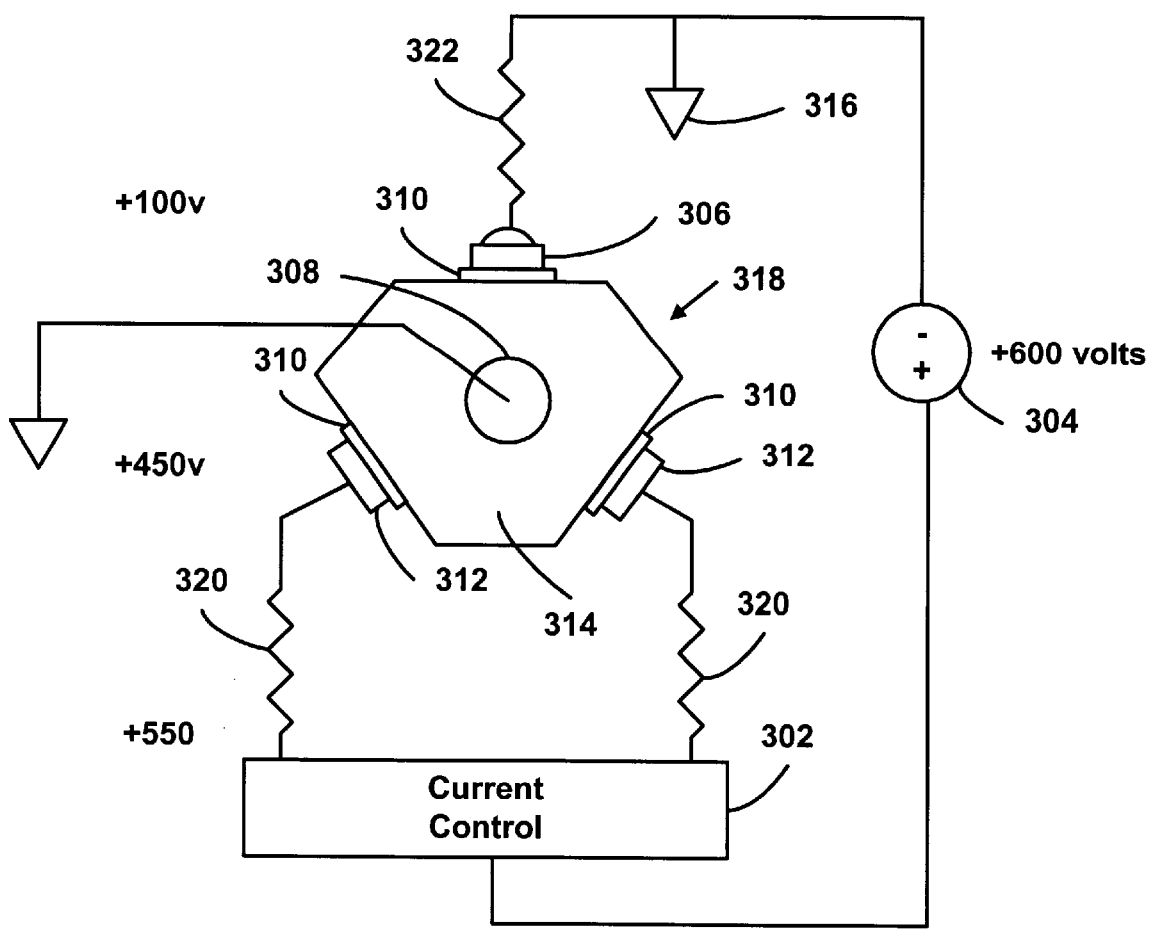
FIG. 6 is a schematic of a ring laser gyroscope system showing the location of the current control with respect to ground, according to an exemplary embodiment of the present invention.

FIG. 6 is a schematic of an exemplary embodiment of a ring laser gyroscope system 300. The ring laser gyroscope system 300 is substantially the same as ring laser system 200 with the addition of a cathode resistor 322. By adding the cathode resistor 322 to the ring laser gyroscope system 300, the cathode 306 may be at a higher electrical potential than the mounting structure 308. The mounting structure 308 may be at the lowest electrical potential the system 300. Therefore, ion migration may be directed towards the mounting structure 308. Ion degradation of the electrode seals 310 may be further reduced, increasing the lifetime of the seals 310, and thereby increasing the operational lifetime of the gyroscope 318. No modifications to the manufacturing process of the ring laser gyroscope 318 are necessary and the mounting structure may not be damaged by ion accumulation during the operational lifetime of the gyroscope 318.

Figure 7:
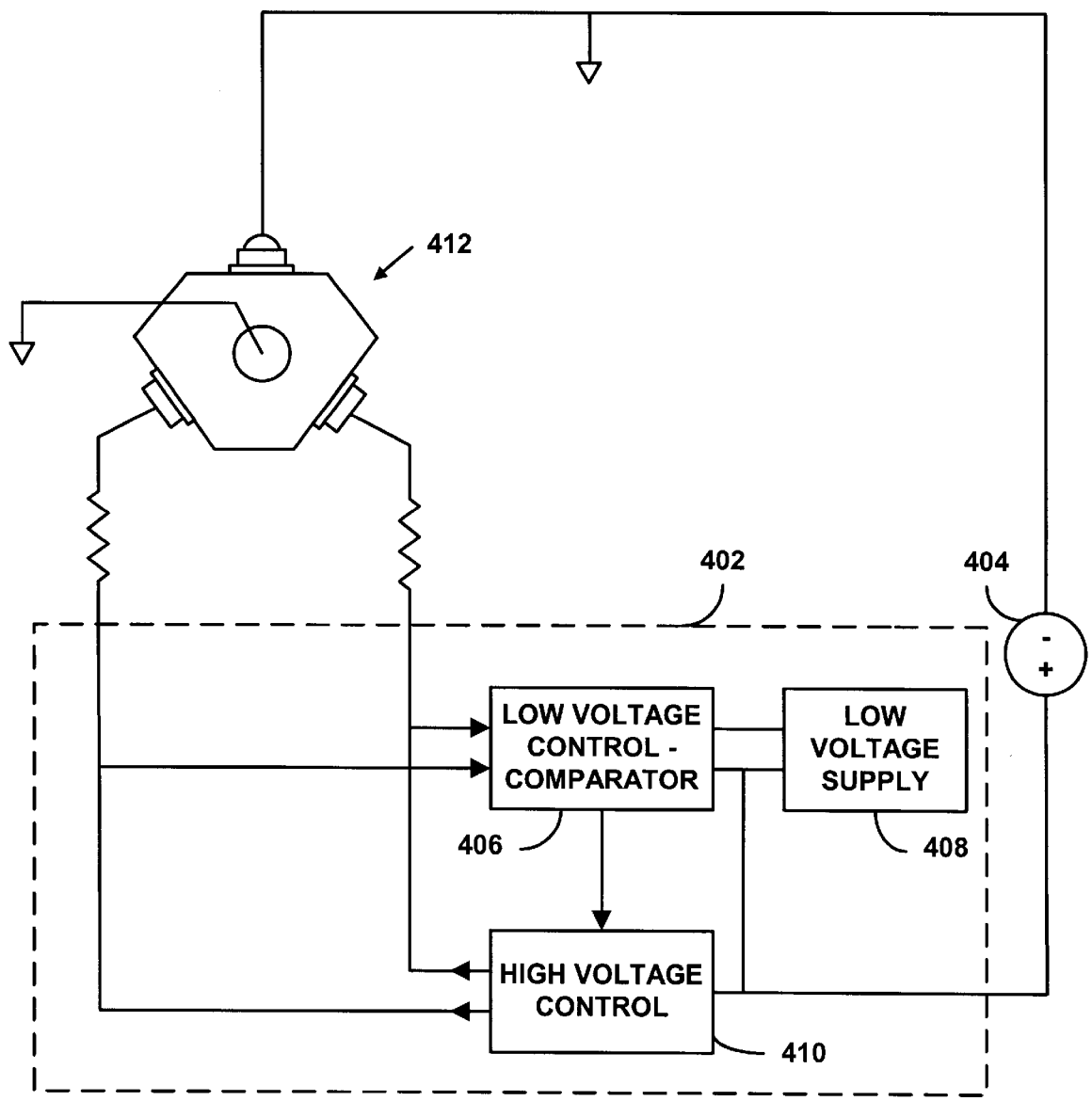
FIG. 7 is a schematic of a ring laser gyroscope system showing a block diagram of an exemplary current control, according to an exemplary embodiment of the present invention.

FIG. 7 is a schematic of an exemplary ring laser gyroscope system 400 showing a block diagram of an exemplary current control 402. Current control 402 is substantially the same as current control 202 in ring laser gyroscope system 200. Current control 402 may include a low voltage control and comparator circuit 406, a low voltage supply 408, and a high voltage control circuit 410. The low voltage supply 408 may provide low voltage power to both the low voltage control and comparator circuit 406 and the high voltage control circuit 410. The low voltage supply 408 may also be electrically connected to the non-ground side of power supply 404. Power supply 404 is substantially the same as power supply 204 in ring laser gyroscope system 200.

The low voltage control and comparator circuit 406 compares the amount of current entering the ring laser gyroscope 412 with a reference value and sends a signal to the high voltage control circuit 410. The high voltage control circuit 410 substantially maintains a constant current entering into the ring laser gyroscope 412. Ring laser gyroscope 412 is substantially the same as ring laser gyroscope 218 in ring laser gyroscope system 200.

Other current control designs may be used, such as designs similar to those outlined in U.S. Pat. No. 5,414,727, "Active Current Control Apparatus," and U.S. Pat. No. 5,271,027, "Gas Discharge Device Current Control Circuit," which are both assigned to the same assignee as the present invention.

Ring laser gyroscopes have previously been powered with positive supply voltages in single or limited use applications in which the gyroscope has a very short operational lifetime. These applications include missile guidance systems in which the operational lifetime of the gyroscope may be measured in minutes. Ion degradation of the electrode seals is not an operational problem in these applications because the gyroscope does not operate for a long enough time to allow the ions to form a layer. Additionally, the ring laser gyroscopes that are used in single or limited use applications may employ different types of electrode seal material and/or frame material because these applications may not require the gyroscope to operate in conditions in which thermal expansion is a critical factor. For example, frit seals may be used. These seals experience less ion degradation because the bonding energy of a frit seal is much higher than that of an indium seal. A frame material such as BK7, a hard borosilicate crown glass, may be used. The ions produced from this type of frame material have a slower diffusion rate, which would increase the time it would take to experience an ion degradation problem.

Current control biasing to protect electrode seals is only needed when the ring laser gyroscope has a long term or continuous use application, such as in aircraft, boat, tank, and pipeline applications. For example, the operational lifetime of a gyroscope located in a commercial aircraft may be ten to twenty years. It may take several years of gyroscope operation before the problem of ion degradation of the electrode seals becomes an issue. The length of time before seal degradation occurs is based on the combination of operational time, elevated temperature, and thermal cycling. Ion diffusion may be strongly dependent on temperature and more exposure to high temperatures may increase the rate at which the electrode seals degrade. For example, a gyroscope with a high-temperature application and a life expectancy of ten years may encounter an electrode seal degradation problem after two to three years of gyroscope operation. Accelerated operational life tests may demonstrate a three to four fold increase of the operational lifetime of the electrode seals by reducing the diffusion of the ions to the seals. For example, the operational lifetime of the electrode seals may increase from 5,000 hours to 15,000 hours. While the embodiments have been described for ring laser gyroscope operations, they may also apply to gyroscope manufacturing. By providing a positive supply voltage and positioning the current control on the non-ground side of the power supply, the electrode seals may be protected from ion degradation during burn-in testing of the frame prior to the sale of the gyroscope. Burn-in testing is performed at elevated temperatures to identify defects prior to delivery.

Various embodiments of the present invention can be carried out with a variety of different equipment and devices without departing from the scope of the invention itself. It is also understood that this invention applies to other materials that may be impacted by ion migration as well. For example, current control biasing may protect the epoxy bond between the path length control (PLC) drivers and the transducer mirrors. The claims should not be read as limited to the described order or elements unless stated to that effect. Therefore, all embodiments that come within the scope and spirit of the following claims and equivalents thereto are claimed as the invention.

We claim:

1. A system for biasing a ring laser gyroscope to protect electrode seals, comprising in combination:

a frame, wherein a plurality of electrodes are attached to the frame, wherein an electric field generated between the plurality of electrodes during operation of a gyroscope causes ions in the frame to migrate toward a lowest electrical potential;

a plurality of seals each located between one of the plurality of electrodes and the frame;

a power supply to provide a positive potential, wherein the power supply has a ground side and a non-ground side;

a current control electrically located on the non-ground side of the power supply; and a mounting structure electrically connected to be at the lowest electrical potential, whereby degradation of the plurality of seals is minimized.

2. The system of claim 1, wherein the plurality of electrodes includes at least one cathode.

3. The system of claim 1, wherein the plurality of electrodes includes at least one anode.

4. The system of claim 1, wherein the ions migrate to the mounting structure, and wherein migration to the plurality of electrodes is minimized.

5. The system of claim 1, wherein the mounting structure is not damaged by ion accumulation.

6. The system of claim 1, wherein the mounting structure is a dither motor.

7. The system of claim 1, wherein the plurality of seals are each constructed of a material selected from the group consisting of indium alloys, tin alloys, and lead alloys.

8. The system of claim 1, wherein the plurality of seals are each constructed of a material selected from the group consisting of indium, tin, and lead.

9. The system of claim 1, wherein the frame is constructed of a glass ceramic.

10. The system of claim 1, wherein the power supply provides substantially +600 volts.

11. The system of claim 1, wherein the gyroscope is operable in a continuous application.

12. A method for biasing a ring laser gyroscope to protect electrode seals, comprising in combination:

connecting a cathode to a ground side of a power supply; and connecting a current control to a non-ground side of the power supply causing a mounting structure to be at a lowest electrical potential, whereby degradation of the electrode seals is minimized.

13. The method of claim 12, wherein ions migrate to the mounting structure, and wherein migration to the cathode is minimized.

14. The method of claim 12, wherein the mounting structure is not damaged by ion accumulation.

15. The method of claim 12, wherein the mounting structure is a dither motor.

16. The method of claim 12, wherein the power supply provides a positive voltage to place the mounting structure at the lowest electrical potential.

17. The method of claim 16, wherein the power supply provides +600 volts.

18. The method of claim 12, wherein the electrode seals are constructed of a material selected from the group consisting of indium alloys, tin alloys, and lead alloys.

19. The method of claim 12, wherein the electrode seals are constructed of a material selected from the group consisting of indium, tin, and lead.

20. In a continuous application of a ring laser gyroscope system the improvement comprising:

biasing the ring laser gyroscope system so that ion migration is directed substantially towards a mounting structure, thereby minimizing migration to a plurality of electrodes.

21. The improvement of claim 20, wherein the mounting structure is not damaged by ion accumulation.

22. The improvement of claim 20, wherein biasing includes placing the mounting structure at an electrical potential that is at least as low as that of any of the plurality of electrodes.

23. A system for biasing a ring laser gyroscope to protect electrode seals in a continuous application, comprising in combination:

a frame constructed of glass ceramic, wherein a plurality of electrodes are attached to the frame, wherein the plurality of electrodes includes at least one cathode and at least one anode, wherein an electric field is generated between the plurality of electrodes during operation of the gyroscope causing ions in the frame to migrate toward a lowest electrical potential;

a plurality of seals constructed of indium, each located between one of the plurality of electrodes and the frame;

a power supply to provide a positive potential of substantially +600 volts, wherein the power supply has a ground side and a non-ground side;

a current control electrically located on the non-ground side of the power supply; and a mounting structure electrically connected to be at the lowest electrical potential, wherein the ions migrate to the mounting structure, wherein the mounting structure is not damaged by ion accumulation, and wherein the mounting structure is a dither motor, whereby migration to the plurality of electrodes is minimized.

24. The system of claim 23, wherein a continuous application is selected from the group consisting of aircraft navigation, boat navigation, tank navigation, control of pipeline inspection gear.

25. The system of claim 23, wherein a rate of ion migration increases with temperature.

26. The system of claim 23, wherein the current control comprises a low voltage supply, a high voltage control circuit, and a low voltage control and comparator circuit.

* * * * *

UNITED STATES PATENT AND TRADEMARK OFFICE
CERTIFICATE OF CORRECTION

PATENT NO. : 6,714,580 B2
DATED : March 30, 2004
INVENTOR(S) : Steven P. Ecklund and Timothy J. Callaghan It is certified that error appears in the above-identified patent and that said Letters Patent is hereby corrected as shown below:

Column 3,
Line 23, please delete the period from "1.02." should read, -- The current control 102.... --

Column 8,
Line 20, please add -- and -- after "tank navigation,". should read, "The system of claim 23, wherein a continuous application is selected from the group consisting of aircraft navigation, boat navigation, tank navigation, and control of pipeline inspection gear."

Signed and Sealed this

Twenty-ninth Day of June, 2004

JON W. DUDAS
*Acting Director of the United States Patent and Trademark Office*